US008392060B2

(12) United States Patent
Stephan et al.

(10) Patent No.: US 8,392,060 B2
(45) Date of Patent: Mar. 5, 2013

(54) METHOD FOR FEEDBACK OF STATES OF AN ELECTRIC COMPONENT TO AN ENGINE CONTROL DEVICE OF AN INTERNAL COMBUSTION ENGINE

(75) Inventors: Waldemar Stephan, Dortmund (DE); Thomas Wienecke, Willich (DE); Peter Rechberg, Recklinghausen (DE); Joachim Mertens, Hilden (DE); Rainer Strauss, Moenchengladbach (DE)

(73) Assignee: Pierburg GmbH, Neuss (DE)

( * ) Notice: Subject to any disclaimer, the term of this patent is extended or adjusted under 35 U.S.C. 154(b) by 604 days.

(21) Appl. No.: 12/601,931

(22) PCT Filed: Apr. 28, 2008

(86) PCT No.: PCT/EP2008/055147

§ 371 (c)(1), (2), (4) Date: Nov. 25, 2009

(87) PCT Pub. No.: WO2008/145469

PCT Pub. Date: Dec. 4, 2008

(65) Prior Publication Data

US 2010/0174441 A1 Jul. 8, 2010

(30) Foreign Application Priority Data

May 25, 2007 (DE) ........................ 10 2007 024 562
Jun. 8, 2007 (DE) ........................ 10 2007 026 601

(51) Int. Cl.
*G01M 17/00* (2006.01)
*G06F 7/00* (2006.01)
*G06F 19/00* (2011.01)

(52) U.S. Cl. ...................... 701/33.6; 701/29.1; 701/33.7

(58) Field of Classification Search ................ 701/31.7, 701/33.6, 33.7, 29, 29.1, 31.4, 102
See application file for complete search history.

(56) References Cited

U.S. PATENT DOCUMENTS

| | | | |
|---|---|---|---|
| 5,787,132 | A | 7/1998 | Kishigami et al. |
| 6,321,127 | B1 | 11/2001 | Kondo |
| 6,490,512 | B1 | 12/2002 | Niggemann |
| 2005/0210866 | A1 | 9/2005 | Ito et al. |
| 2009/0052315 | A1 | 2/2009 | Kollner et al. |
| 2009/0235727 | A1 | 9/2009 | Weiberle et al. |

FOREIGN PATENT DOCUMENTS

| | | | |
|---|---|---|---|
| DE | 4125678 | A1 | 2/1993 |
| DE | 19852351 | A1 | 5/2000 |
| DE | 102004024954 | A1 | 12/2005 |

(Continued)

OTHER PUBLICATIONS

International Search Report for PCT/EP2008/055147, mailed on Oct. 14, 2008.

*Primary Examiner* — Thomas Tarcza
*Assistant Examiner* — Kevin Myhre
(74) *Attorney, Agent, or Firm* — Norman B. Thot

(57) ABSTRACT

The present invention relates to a method for feedback of states of an electric component to an engine control device of an internal combustion engine using a control unit for the electric component including a detection device configured to detect faults. The method includes configuring the control unit, connecting the control unit to the engine control device via a signal line, receiving a PWM signal generated in the engine control device, tying the signal line to ground for a feedback of data of the electric component to the engine control device; and identifying a fault based on a duration of the connection to ground.

9 Claims, 2 Drawing Sheets

FOREIGN PATENT DOCUMENTS

| | | | |
|---|---|---|---|
| DE | 102005060025 | A1 | 6/2007 |
| EP | 1400678 | A2 | 3/2004 |
| JP | 63-009678 | A | 1/1988 |
| JP | 64-032593 | | 2/1989 |
| JP | 8-098284 | | 4/1996 |
| JP | 2003148237 | A | 5/2003 |
| JP | 2004-362181 | A | 12/2004 |
| WO | 0188347 | A1 | 11/2001 |

METHOD FOR FEEDBACK OF STATES OF AN ELECTRIC COMPONENT TO AN ENGINE CONTROL DEVICE OF AN INTERNAL COMBUSTION ENGINE

CROSS REFERENCE TO PRIOR APPLICATIONS

This application is a U.S. National Phase application under 35 U.S.C. §371 of International Application No. PCT/EP2008/055147, filed on Apr. 28, 2008 and which claims benefit to German Patent Application No. 10 2007 024 562.0, filed on May 25, 2007 and to German Patent Application No. 10 2007 026 601.6, filed on Jun. 8, 2007. The International Application was published in German on Dec. 4, 2008 as WO 2008/145469 under PCT Article 21(2).

FIELD

The present invention relates to a method for feedback of states of an electric component to an engine control device of an internal combustion engine, comprising the use of a control unit for the electric component, which control unit includes means for detection of faults and is connected to said engine control device via a signal line and is arranged to receive a PWM signal generated in said engine control device, said control unit being arranged to tie said signal line to ground so as to perform a feedback of data of said electric component to said engine control device.

BACKGROUND

In the field of automobile technology, there has recently developed an ever more frequent demand that electric components such as e.g. pumps and actuators, should be able to return to the engine control device a feedback message indicating states of the components. Normally, these components are driven by the engine control device through pulse width modulation. This is performed via a sole existing signal line which serves both for transmission of the desired signal in the form of a PWM coding from the engine control device to the control unit of the component and which, conversely, shall also be used for communicating a possibly existing fault state or actual state of the component to the engine control device.

Such feedbacks of states for diagnostic purposes are known as far as the component will tie the signal line to ground if any fault is present. This will be detected by the engine control device because this device is used as a master. At the same time, the engine control device will measure the voltage on the signal line so that, if the engine control device tries to output a high level while, however, the line remains on a low level because of the ground connection, this will indicate that either the component does not work properly or the line is short-circuited. In the past, for this reason, the switching of the signal line to ground as performed by the electric component has commonly been used to communicate to the engine control device that a fault has occurred.

SUMMARY

This concept suffers from the disadvantage that, if a fault of whatever variety occurs, all that is possible is to feed back this fault to the engine control device, however, without the possibility of actually identifying this fault. Further, no feedback is performed in regard to the actual state of the electric component.

An aspect of the present invention is to provide a method for feedback of states of an electric component to an engine control device of an internal combustion engine wherein, in said method, a fault occurring in the electric component will not only be transmitted to the engine control device but will also be recognized, i.e. identified in the engine control device. In addition, it shall be accomplished that also without occurrence of a fault, information on an actual state of the electric component can be communicated to the engine control device.

In an embodiment, the present invention relates to a method for feedback of states of an electric component to an engine control device of an internal combustion engine using a control unit for the electric component including a detection device configured to detect faults. The method includes configuring the control unit, connecting the control unit to the engine control device via a signal line, receiving a PWM signal generated in the engine control device, tying the signal line to ground for a feedback of data of the electric component to the engine control device, and identifying a fault based on a duration of the connection to ground.

Depending on the duration of a connection of the signal line to ground, the duration can therefore be exactly assigned to a fault whereby the engine control device can identify this fault. Such a solution requires only minimum adaptation of the components used. Accomplished thereby is a flexible diagnostic functionality wherein only minimal resources are necessitated in the control device of the electric component as well as in the external engine control device, since it will merely be required to store, in the engine control device, a corresponding comparative code with respect to the duration of the transmitted signal.

BRIEF DESCRIPTION OF THE DRAWINGS

The present invention is described in greater detail below on the basis of embodiments and of the drawings relating to electromotoric pump as an example in which.

DETAILED DESCRIPTION

Figure 1:
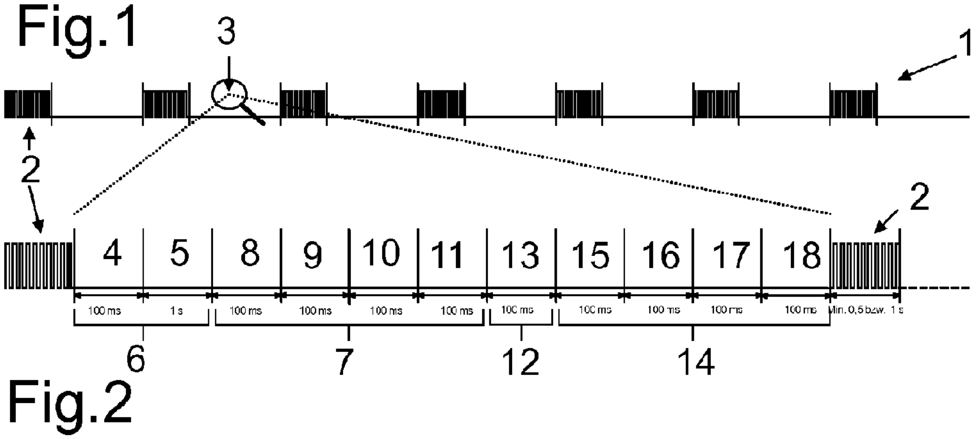
FIG. 1 shows a typical protocol of a method of the present invention for feedback of states of an electric component, referring to a pump by way of example.

In an embodiment of the present invention, the duration of said ground connection is additionally used for feedback of the actual value of the electric component. The feedback of a fault or also of the actual value of the electric component can by definition be performed in a successive manner. Accordingly, it appears useful to carry out such a feedback regularly while the driving of the electric component is unchanged. The coding of this actual value of the electric component can be performed e.g. linearly so that a grounding for a defined maximum duration of e.g. one second would correspond to a 100% rotational speed and half of this duration would correspond e.g. to a 50% rotational speed. Thereby, it is rendered possible, in a very simple manner, to realize a previously unknown feedback of an actual value of the electric component to the engine control device.

For example, in a first time block, the signal line is tied to ground for a predefined length of time in order to communicate to the control device—serving as a master—that a feedback is performed. This is necessary so that possibly occurring disturbances can be differentiated from a protocol for fault- or actual-state detection. Such disturbances are normally distinctly shorter than this synchronization period.

In a subsequent second time block, the duration of the connection of the signal line to ground is used as a measure for the actual state of the electric component if no fault occurs, wherein, subsequently, the connection will be released again by the component. In a corresponding manner, the information that a direct proportionality exists between the duration of the ground connection in this second time block and the actual rotational speed, could be lodged in the engine control device.

Additionally, in case of a fault, the connection of the signal line to ground will be maintained until a duration identifying this fault has lapsed. Thus, if a corresponding code has been lodged in the engine control device, a fault detected by the control unit of the electric component can be clearly identified on the basis of the duration of the ground connection. To each individual fault which is detectable by the control unit, exactly one defined duration has been assigned. Consequently, such an identification of faults can be performed by the engine control device with minimum electronic expenditure.

In an embodiment of the present invention based on the embodiment described above, the possible faults will be classified and assigned to different groups so that, depending on the seriousness of the fault, the transmission times will become longer. Faults that have similar consequences for the function of the electric component can, for example, be combined into such groups.

Correspondingly, upon release of the connection of the signal line, the control unit of the component in the course of a first duration after said release will assume a fault belonging to a group of faults leading to a reduced operation of the electric component, while, in the course of a second duration, the control unit will assume a fault belonging to a group of faults of the electric component, and, in the course of a subsequent duration, the control unit will assume a fault belonging to a group of faults in the system, wherein the connection of the signal line to ground will be maintained until the duration defined for the occurring fault having the longest identifying duration will have lapsed. Hereby, it is safeguarded that it will really be the most serious fault which is fed back to the engine control device, so that corresponding measures can be taken.

In an embodiment of the present invention, the electric component is an electromotoric pump wherein said group of faults which cause a reduced operation of the pump is subdivided into a time block for a first rotational-speed limitation, a time block for a second rotational-speed limitation, a time block for dry-run detection and a time block for performance limitation. These time blocks represent a first and not all too serious group of faults.

For example, if the electric component is an electromotoric pump, the group of faults of the electric component comprises at least one time block for a pump fault caused by overcurrent. This pump fault thus forms a second group of faults which, due to the higher weighting, will be checked for at a time subsequent to the first-mentioned group of faults.

It is also of advantage, when using an electromotoric pump, if said group of faults in the system comprises at least one time block for an occurring overvoltage, a time block for dry-run switch-off and a time block for temperature switch-off Such faults will lead to a cease of the functionality of the system so that a corresponding feedback would have to be performed by the engine control device, e.g. the driver of a truck.

The present method as well as the modified method steps are effective to safeguard in a simple manner that feedback messages on the state of the electric component will be transmitted to the engine control device. By a corresponding weighting of the communicated faults, the opportunity is provided to initiate possibly required measures. In contrast to previously known embodiments, such a feedback can be performed for the whole duration or periodically, as long as no change of the drive signal occurs. Further, the real actual state can be made available to the engine control device. For this purpose, extremely little expenditure will be required in the external control device.

The methods—as shown in the Figures—for feedback of states of an electric component to a control device of an internal combustion engine will be explained with reference to the example of an electric cooling-water pump installed in a vehicle. In said vehicle, an engine control device is arranged which is connected, via a signal line, to a control unit of said cooling-water pump. Said control unit includes various means for detection of faults of the pump and respectively for measurement of operational states. Such means from the field of circuit technology are known. Thus, for instance, the rotational speed of a pump can be detected via contactless sensors. Also the corresponding electric circuits, e.g. for detection of overcurrent, overvoltage or the like, are known.

This method now offers the possibility to exchange, via the signal line, a maximum of information between the control unit of the cooling-water pump and the engine control device.

At the signal line, merely two states can be measured by the engine control device, i.e. the high state or the low state. Normally, the control unit receives a pulse-width-modulated signal of the engine control device, wherein the signal line will alternately conduct a high level and a low level. The different duration of these times serves for rotational-speed control of the pump. However, by use of a corresponding circuit, it is possible for the control unit of the cooling-water pump to tie the signal line to ground so that, as long as the ground connection of the signal line exists, the engine control device will receive only a low signal.

Illustrated in FIG. 1 is illustrated a typical drive process 1 for the engine control device of the electromotoric cooling-water pump. For this purpose, a PWM signal 2 is transmitted from the engine control device to the control unit via the signal line. When the control unit receives such a signal, the pump will be operated with the rotational speed resulting therefrom, until a possibly changed PWM signal 2 is transmitted via the signal line. Now, the possibility exists that the control unit will tie the signal line to ground. This can be performed at fixed intervals which may also be selected to be very small. This time period 3 during which the signal line remains tied to ground, serves for feedback of states, one of them being represented with corresponding enlargement.

At a time e.g. after lapse of a predetermined duration of the PWM signal 2, the control unit of the pump will now tie the signal line to ground. According to the example illustrated in FIG. 1, this ground connection is first maintained for 100 ms for thus communicating to the engine control device that a feedback takes place. This span of time thus forms a synchronization time block 4. This block is followed by an e.g. one-second-long time block 5 for the actual rotational speed. During each feedback, these two time blocks 4 and 5 will be output at least partially and be combined into a group 6 after which the transmission will end if no fault occurs. Thus, in case that only group 6 is transmitted, the pump is faultless.

This group 6 is now followed by a second group 7 for identification of a reduced operation of the pump. In the present embodiment, said second group consists of four time blocks of a length of 100 ms, wherein time block 8 serves for detecting a first rotational-speed limitation, time block 9 serves for detecting a second rotational-speed limitation, time block 10 serves for detecting a dry run and time block 11 serves for detecting a limitation of the pump performance.

Said second group is followed by a group 12 in which pump faults will be combined, wherein, in the present embodiment, this group 12 consists only of one time block 13 for detection of overcurrent and, respectively, plausibility faults 13, said block again having a length of 100 ms.

Subsequent to the transmission of the faults of group 12, faults of a group 14 will be transmitted, in which group a successive processing of system faults will be performed. Comprised herein are, as a first time block 15 of the system faults, the identifying of an over-voltage; as a second time block 16, the detecting of a dry-run switch-off; as a third time block 17, the detecting of a temperature switch-off; and, as a fourth time block 18, the identifying of a defective power supply of the relay. These time blocks and respectively groups of time blocks 4 to 18 thus form the maximum process of performing the feedback of states of the control unit of the water pump to the engine control device.

After completion of this program, the control unit of the pump will wait at least 0.5 to 1 s before a new feedback takes place. This is to say that, after completion of the feedback, the normal connection of the signal line between the engine control device and the control unit of the pump will be established again.

Figure 2:
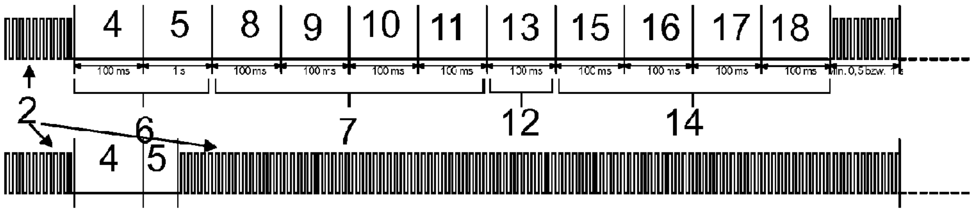
FIG. 2 shows the development of the method at a nominal rotational speed of the pump of 50% without occurrence of faults.

FIG. 2 now illustrates the a manner in which the feedback is to proceed if the pump is operated with a rotational speed of 50% as compared to the maximum rotational speed. First, after the signal line has been switched to ground, the sync time block 4 is transmitted so that the engine control device will detect that a feedback is performed. Thereafter, in the present embodiment, the connection to ground is maintained for 0.5 s and then will be switched over again. For the engine control device, this means—if a linear correlation has been defined—that, since the signal of time block 5 of the actual rotational speed has only half the length of the possible total length of 1 s, also the rotational speed will amount to only 50% of the maximum rotational speed. Since no fault has been detected in the control unit, the connection of the signal line to ground will be terminated at this point so that, via the signal line, there will again be transmitted the PWM signal 2 from the engine control device to the control unit of the water pump.

Figure 3:
FIG. 3 shows the protocol upon occurrence of an overcurrent fault at the pump.

For further explanation, FIG. 3 illustrates how the program will proceed if the control unit has detected, among said group 12 of pump faults, an overcurrent indicated by time block 13. In this case, the connection of the signal line to ground will be maintained until the lapse of the duration of time block 4, i.e. the synchronization time block, as well as time block 5 for the actual rotational speed, as well as time block 8 for the first rotational speed limitation, time block 9 for the second rotational speed limitation, time block 10 for dry-run detection, time block 11 for performance limitation and, finally, time block 13 for overcurrent. This means that the connection to ground is maintained for 1.6 s. The engine control device will now detect that, after 1.6 s, the normal connection of the signal line between the engine control device and the electric component is established again, and will be able, on the basis of a comparison code lodged in the engine control device, to determine that an overcurrent fault has evidently occurred which corresponds to a grounding for a duration of 1.6 s.

From the above, it also becomes evident that, in case that a fault occurs, no actual rotational speed can really be fed back. However, it will still be possible for the engine control device to now transmit a corresponding fault message to the conductor of a vehicle.

Figure 4:
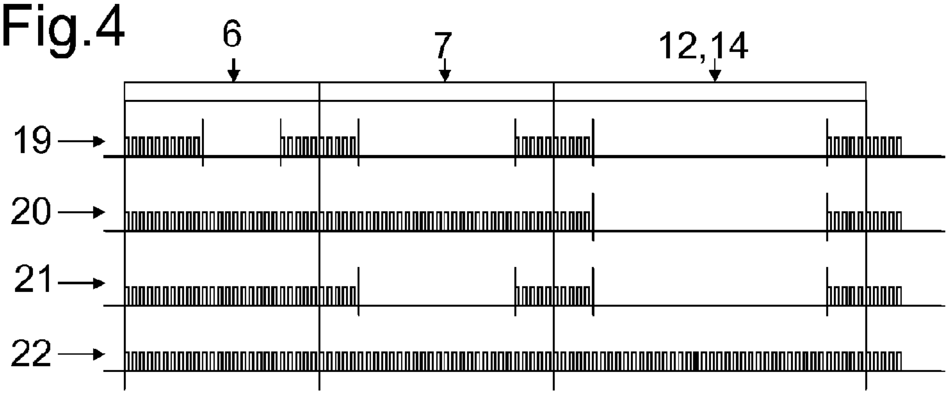
FIG. 4 shows a method for feedback wherein, depending on the application, different modes can be selected.
Figure 5:
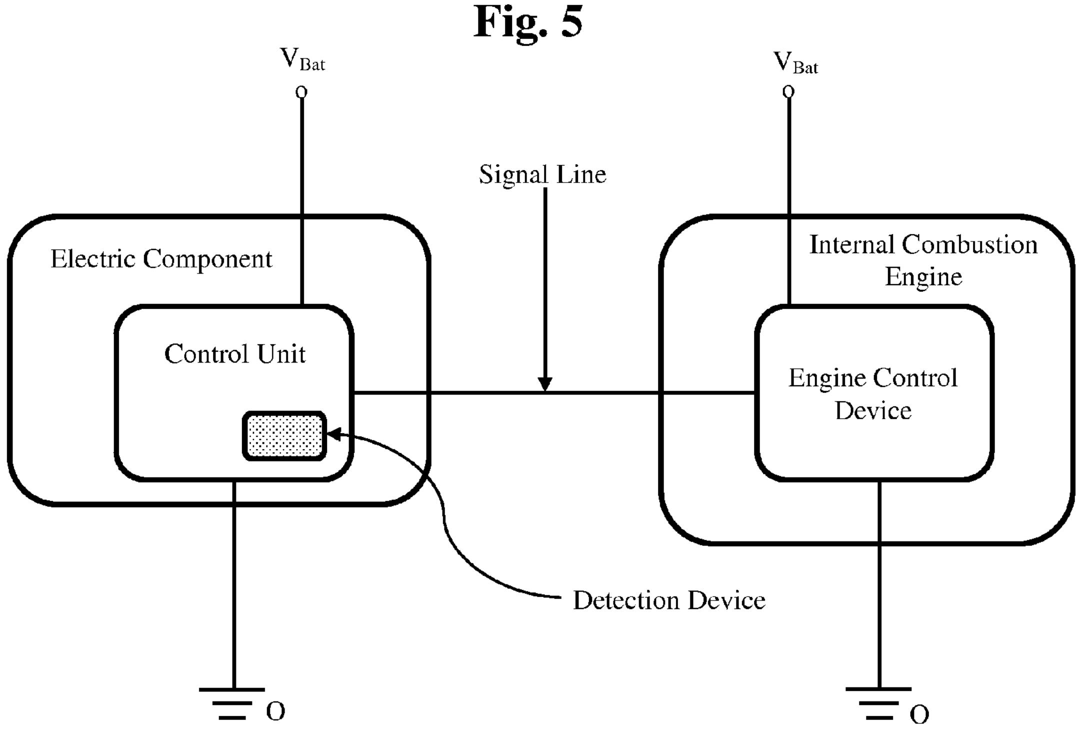
FIG. 5 shows the electric component with control unit, the engine control device, the signal line connecting the control unit to the engine control device, and the grounding of the signal line.

If such a process has been lodged, it can of course also be freely selected in which modes such a system is used e.g. for different vehicles or internal combustion engines. For instance, in the first fault case 19, as shown in FIG. 4, there is selected a mode in which a protocol transmission will take place if the pump is faultless, and also upon occurrence of a fault from group 7, i.e. in case of reduced operation, as well as upon occurrence of a fault from any one of groups 12,14, i.e. in case of pump or system faults. In line 20, it is shown that a transmission will be performed only in case of a pump or system fault, i.e. in case of a relatively serious error according to any one of groups 12 or 14.

In the following line 21, a third mode is represented wherein a transmission of the protocol is performed in each fault case, i.e. both upon occurrence of an error from group 7 indicating reduced operation, and upon occurrence of a pump error or a system error, i.e. an error from any one of groups 12 or 14. There could also be provided a complete deactivation of the transmission of the protocol according to line 22 without the need to perform changes on the hardware or software. Thereby, adaptation to different customer wishes is made possible because of the ability to switch between the different modes.

It is obvious that, by such a method for feedback of states, a very flexible diagnostic functionality is realized, while requiring only a minimum of additional resources in the component, the control unit or the engine control device. The transmission of such a protocol as described by way of the above exemplary embodiment retains its compatibility with the known state of the art while, however offering the possibility to transmit additional information, particularly with respect to the actual value. No protocol monitoring will be required anymore. Further, by a corresponding grouping of the faults, it is guaranteed that blind periods of the control will be minimized Depending on the electric component used, adaptations can be performed, and other kinds of subdivisions into groups or other sequences in the processing of possible faults may be selected. Also, it will be left to the respective user's discretion to what extent all of the definable groups shall really be used, or whether additional groups or time blocks shall be defined.

The present invention is not limited to embodiments described herein; reference should be had to the appended claims.

The invention claimed is:

1. A method for feedback of states of an electric component to an engine control device of an internal combustion engine using a control unit for the electric component including a detection device configured to detect faults, the method comprising:

configuring the control unit;

connecting the control unit to the engine control device via a signal line;

receiving a PWM signal generated in the engine control device;

tying the signal line to ground for a feedback of data of the electric component to the engine control device;

identifying a fault based on a duration of the connection to ground; and using the duration of the connection to ground for the feedback of an actual value of the electric component.

2. The method as recited in claim 1, wherein the feedback includes a first time block during which first time block the signal line is tied to ground for a predefined duration so as to communicate a first time block feedback to the engine control device which first time block feedback is used as a master.

3. The method as recited in claim 2, wherein the feedback includes a second variable time block during which second variable time block a connection of the signal line to ground measures an actual state of the electric component if no fault occurs, the connection then being released by the control unit of the electric component.

4. The method as recited in claim 1, further comprising, upon occurrence of a fault, maintaining the connection of the signal line to ground until a lapse of a duration identifying the fault.

5. The method as recited in claim 1, further comprising classifying a plurality of possible faults and assigning them to different groups.

6. The method as recited in claim 5, further comprising, upon a release of the connection of the signal line:

assuming a fault belonging to a first group of faults leading to a reduced operation of the electric component during a first duration after the release;

assuming a fault belonging to a second group of faults leading to a reduced operation of the electric component during a second duration after the release; and assuming a fault belonging to a third group of faults in a system during a third duration after the release;

wherein the connection of the signal line to ground is maintained until the duration defined for the longest identifying duration of the first, second and third faults has lapsed.

7. The method as recited in claim 6, wherein the electric component is an electromotoric pump wherein the first group of faults comprises a first rotational-speed limitation time block, a second rotational-speed limitation time block, a dry-run detection time block and a performance limitation time block.

8. The method as recited in claim 6, wherein the electric component is an electromotoric pump wherein the second group of faults comprises a time block for a pump fault caused by overcurrent.

9. The method as recited in claim 6, wherein the electric component is an electromotoric pump wherein the third group of faults in the system comprises an occurring over-voltage time block, a dry-run switch-off time block and a temperature switch-off time block.

* * * * *